United States Patent
Hoxsie

[15] 3,683,324
[45] Aug. 8, 1972

[54] DEPTH METER HAVING IMPROVED TIME VARYING GAIN CONTROL

[72] Inventor: Frank E. Hoxsie, Tulsa, Okla.

[73] Assignee: Lowrance Electronics Manufacturing Corporation, Tulsa, Okla.

[22] Filed: June 19, 1970

[21] Appl. No.: 47,728

[52] U.S. Cl. ................................. 340/3 R
[51] Int. Cl. ................................. G01s 9/68
[58] Field of Search .................... 340/1 R, 3 R

[56] References Cited

UNITED STATES PATENTS

| | | | |
|---|---|---|---|
| 3,548,370 | 12/1970 | Hoxsie | 340/3 R |
| 2,728,900 | 12/1955 | Ross | 340/3 R |
| 3,061,812 | 10/1962 | Rachwalski | 340/3 R |
| 3,223,965 | 12/1965 | Beebe | 340/3 R |

*Primary Examiner*—Richard A. Farley
*Attorney*—Head & Johnson

[57] ABSTRACT

This invention relates to a meter for indicating the depth of water. More particularly, the invention provides a depth meter having a transducer means for imparting sound pulses near the surface of a body of water in response to electrical energization and in turn for providing electrical signal output in response to reflected sound pulses, a time base circuit providing evenly spaced systems initiating signals, an oscillator circuit providing sequential bursts of electrical energy to the transducer, in response to the system initiating signals, a receiving amplifier connected to the transducer amplifying the reflected signal output in response to reflected sound waves, a metering circuit connected to the time base circuit and the amplifier providing means of indicating the time response between the transmitted signal and the signal received in response to receipt of sound waves as an indication of the distance to the bottom of the body of water reflecting the sound waves from the transducer and a time varying gain control circuit connected to the time base circuit and receiver amplifier providing a time varying bias to the amplifier following each system initiating signal, the bias being applied to the amplifier with time whereby signals resulting from the bottom at greater distances from the transducer are amplified more than signals resulting from shallower depths.

4 Claims, 3 Drawing Figures

PATENTED AUG 8 1972  3,683,324

INVENTOR.
FRANK E. HOYSIE
BY Head & Johnson
ATTORNEYS

INVENTOR.
FRANK E. HOXSIE
BY
*Head & Johnson*
ATTORNEYS

DEPTH METER HAVING IMPROVED TIME VARYING GAIN CONTROL

SUMMARY AND BACKGROUND OF THE INVENTION

For safety and navigational purposes, boat users need means to indicate the depth of the water. Electronic depth sounders are the best known devices for indicating water depth. Depth sounders operate by transmitting pulses of ultrasonic energy from below the surface of a body of water downwardly towards the bottom. The bottom reflects part of the sonic energy back to the surface where the echo impinges on a transducer. The transducer converts the ultrasonic energy into electrical energy which is amplified to a level sufficient to activate a circuit which measures the elapsed time between transmission of the pulse and return of the reflected echo. A metering circuit translates the elapsed time into distance, this being possible since the velocity of sound can be considered constant at approximately 4,800 feet per second in fresh water with only a slight variation due to temperature or chemical changes.

A problem which has confronted depth meter designers is that of providing adequate control of the amplifier sensitivity throughout the echo receiving period. The sensitivity of the amplifier should increase in a manner directly related to the attenuation encountered by the sound signal as it passes through greater depths of water, that is, the amplifier gain for a signal returning from a shallow bottom should be less than for a signal returning from a great depth. In the ideal arrangement the sensitivity of the amplifier versus time following each transmitted pulse should have the same slope as the attenuation of the sound pulse versus the depth of the water.

In this invention means is provided for initiating sequential measuring cycles and simultaneously initiating a time varying voltage control which adjusts the amplifier gain throughout the echo receiving portion of each sounding cycle in such a manner as to compensate for decreasing amplitude of the return echo as it travels through increasing depths of water. Improved automatic time varying gain control means that greater immunity to false depth readings is achieved. False depth readings are frequently caused by air bubbles, fish and other underwater debris between the surface and the bottom. Another source of false reading arises in that sound pulses projected from a transducer passes downwardly to the bottom, are reflected back up, and are reflected a second time from the surface back down to the bottom, and so forth, causing second echoes which sometimes return during a subsequent measuring period producing a spurious signal and a false depth indication. By the automatic time varying gain control arrangement of this invention such spurious signals are more readily rejected.

The depth sounder of this invention includes a transducer, a time base circuit, an oscillator circuit, a time varying gain control circuit, a receiver amplifier circuit, a detector and a metering circuit.

The time base circuit provides evenly time spaced system initiating signals. The oscillator circuit generates bursts of electrical energy at the natural resonant frequency of the transducer in response to each system initiating signal. The time varying gain control circuit provides ramp voltage in response to each time base system initiating signal. This voltage is used in the receiver section as a time varying gain control to regulate automatically the sensitivity of the receiver amplifier circuit as a function of time. The circuit may also include a power amplifier to increase the power level of the energy bursts to the transducer sufficiently to assure an echo from the deepest water to be sounded according to the application of the depth meter.

In the preferred embodiment of the invention the receiver section includes two stages of amplification. The time varying ramp voltage from the time varying gain control circuit is applied to the first amplifier in such a manner as to automatically vary the gain throughout the receiving portion of each sounding cycle. The second amplifier is provided with a manual gain control so that the overall sensitivity of the depth meter can be adjusted.

The metering circuit may be of a variety of arrangements, however, the illustrated and preferred arrangement includes the use of a bi-stable multivibrator. The system initiating signal from the time base circuit sets the multivibrator in one of two stable states. The returning echo, after being amplified, triggers the multivibrator into the other stable state. A meter measures the average current flow in one of the transistors making up the multivibrator during one of the stable states, that is, between the transmission and receipt of a sound pulse by the transducer. The average measurement of current flow provides an accurate indication of the depth of the reflective surface, on the bottom of the body of water, from the transducer.

It is therefore an object of this invention to provide a depth meter including a time base circuit generating evenly time spaced system initiating signals, and an automatic time varying gain control signal actuated by the time base circuit for automatically regulating amplifier gain following each transmission initiation whereby the gain of the amplifier which amplifies the echo pulse is increased with time so that echo pulses from more distant bottoms are amplified more than echo pulses from nearer bottoms.

A more particular object of this invention is to provide a depth meter including a time base circuit actuated time varying gain control plus a manual gain control to provide an adjustable gain control having an automatic time varying gain control signal superimposed thereon.

These and other objects of the invention will be understood by referring to the description and claims, taken in conjunction with the attached drawings.

DESCRIPTION OF THE VIEWS

DETAILED DESCRIPTION

Figure 1:
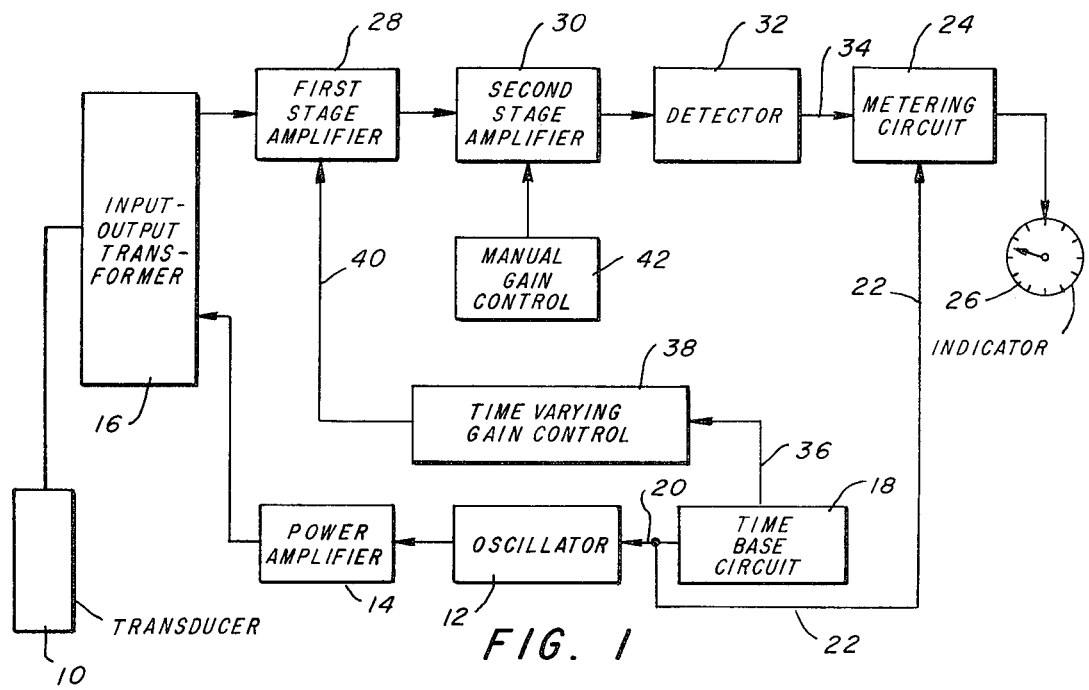
FIG. 1 is a block diagram of a depth meter having improved time varying gain control of this invention.
Figure 2:
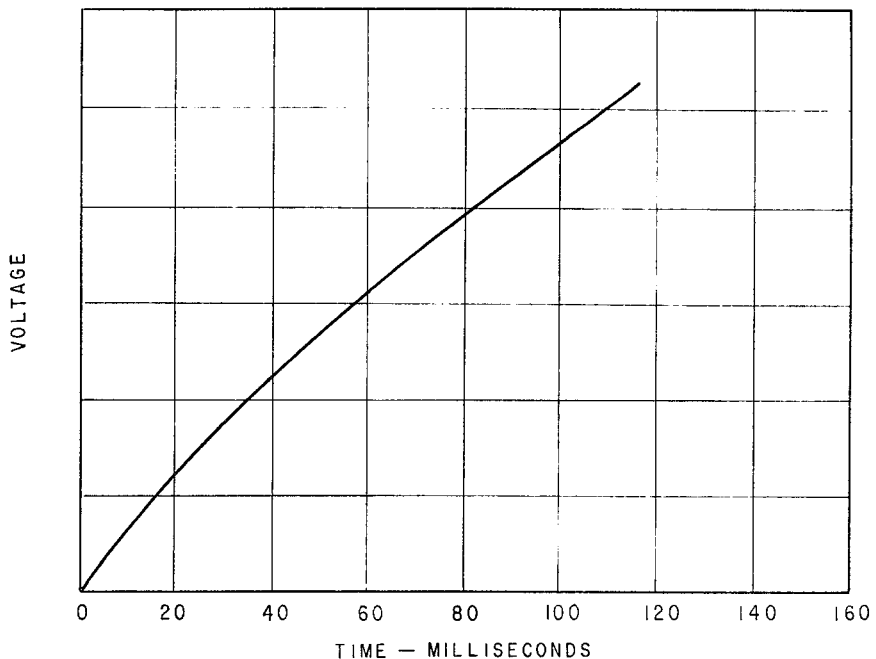
FIG. 2 is a graph of a typical time varying bias voltage applied to the amplifier portion of the invention whereby signals from distant objects are amplified more than signals from nearer objects.

Referring first to FIG. 1, an embodiment of the invention is set out in block diagram. A transducer 10 includes a crystal having the characteristic that when it is subjected to electrical energy it responds to produce sonic vibrations and, in turn, when it is subject to sonic vibrations produced electrical energy. When electrically energized sound vibrations pass radially outwardly from transducer 10 and upon encountering a reflective surface, including the bottom of the body of water in which the transducer is positioned, a sound echo is produced. Upon the echo striking transducer 10 the crystal therein is physically vibrated causing an electrical signal.

To provide sound pulses for the energization of transducer 10, an oscillator circuit 12 is utilized. In the preferred arrangement the oscillator 12 produces sequential short bursts of AC energy at the resonant frequency of transducer 10. These bursts of AC energy are applied to power amplifier 14 and, after amplification, to an input-output transformer 16, and thereby to the transducer 10.

Oscillator 12 is controlled by a time base circuit 18 which provides at output 20 time spaced voltage pulses which function as system initiating signals. The signal applied to oscillator 12 is also applied by conductor 22 to a metering circuit 24. Metering circuit 24 is preferably of the bi-stable multivibrator type. The signal at conductor 22 serves to set the multivibrator of the metering circuit in one stable condition. The echo received at transducer 10 is applied to input-output transformer and thence, by means to be described, to the metering circuit 24 to set the bi-stable multivibrator in the other stable condition. By measurement of the time the metering circuit 24 is in the stable condition at which it exists between the sound producing signal and receipt of the echo signal an indication is given of the distance from the transducer 10 to the surface reflecting the echo. This indication is detected by the total average current flow during such times and is registered in terms of depth in feet on meter indicator 26.

The echo received at transducer 10 is applied to the input-output transformer and thereby to receiver first stage amplifier 28. It can be seen that the sound producing signal from power amplifier 14 is also applied to the receiver first stage amplifier 22 through the input-output transformer, however, this signal is diminished in a way to be described subsequently and, in any event, the signal applied directly to metering circuit 24 by conductor 22 dominates the metering circuit. The echo pulse signal is amplified in first stage 28 and fed to a second stage amplifier 30 and from there the signal is fed to detector 32. The detector 32 is preferably of the threshold type and includes pulse shaping arrangements providing a signal output at conductor 34 to metering circuit 24. When the echo pulse is received, amplified and detected, the bi-stable multivibrator metering circuit 24 is switched to a second condition terminating a measuring cycle.

When a burst of AC energy is initiated in oscillator 12 it is fed to the power amplifier 14 to actuate the transducer 10 as previously described. Concurrently a signal is fed from time base circuit 18 by means of output conductor 36 to a time varying gain control circuit 38. Generally speaking, the time varying gain control circuit 38 provides a ramp voltage biasing signal which is applied by conductor 40 to first stage amplifier 28. The time varying bias signal appearing at conductor 40 is arranged so that the amplification occurring in first stage amplifier 28 is proportional to time elapsed after the signal originating in time base circuit 18, that is, as the time following the initiation of a signal by time base circuit 18 increases, the amplification of the signal in first stage amplifier 28 also increases.

By this arrangement the amplification of the echo signal received from transducer 10 is increased with time. Obviously, the longer it takes the sound signal to pass from transducer 10 to a reflective surface and return, the greater is the distance between the transducer 10 and the reflective surface, and the echo signal is much fainter when reflected from a distant object than it is when reflected from an object nearer the transducer. By means of the time varying gain control signal provided at conductor 40 the first stage amplifier 28 is controlled so that its amplification increases with time to thereby amplify the signals received from distant objects and surfaces to a greater degree compared to those which are received from nearer objects and surfaces. This automatic gain control arrangement has many advantages. Since the sensitivity of the first stage amplifier 28 is low to signals reflected immediately after the sound pulse is applied to transducer 10, that is, the first stage amplifier is less responsive to echo signals appearing at transducer 10 by nearby surfaces, there is greater immunity to false depth readings caused by air bubbles, fish and other underwater objects between the surface and the bottom. In addition, since the receiver operates at a low gain level initially and then increases throughout the sound period, the time averaged amplifier gain required to sound a given water depth is reduced, which in turn reduces the amplifier susceptibility to spurious noise signals. Increased immunity is provided against spurious signals resulting from a second or third reflection from a previous sounding cycle.

An additional feature of this invention is the combination of the time varying gain control circuit with a manual gain control system. The second stage amplifier 30 includes a manual gain control circuit 42. By the manual gain control the operator can set the sensitivity of the depth sounder as required. The total sensitivity of the receiver portion of the depth sounder at any given instant following a sound pulse at transducer 10 is a summation of the manual gain control of circuit 42 plus the time varying gain control of circuit 38. Putting it another way, the total gain of the amplifier portion consisting of first and second stage amplifiers 28 and 30, is the manual gain control set by the operator having the automatic time varying gain control superimposed thereon.

While in the preferred arrangement the two stages of amplification 28 and 30 are utilized as shown with each stage having its separate gain control arrangement, that is, the first stage having the time varying gain control of circuit 38 and the second stage having the manual gain control 42, it can be seen that in another embodiment of the invention only a single stage of amplification may be utilized with the manual and time varying gain control combined and applicable to such single stage amplification.

Figure 3:
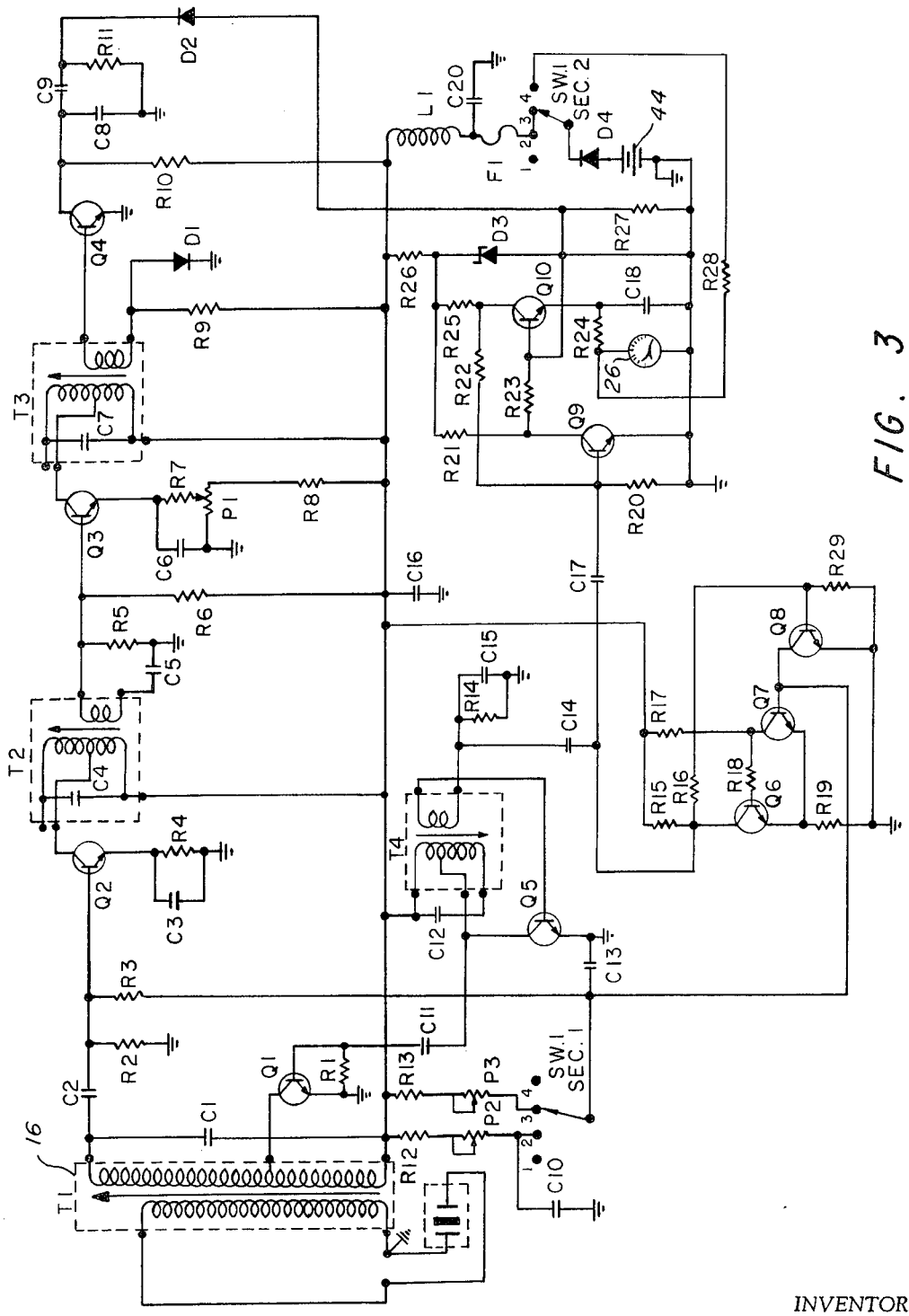
FIG. 3 is a detailed circuit diagram of an operable embodiment of the invention.

For a more detailed description of an embodiment of the invention, reference is now made to the circuit diagram of FIG. 3. The time base circuit includes:

transistors Q6, Q7, and Q8; condensers C10 and C13; potentiometers P2 and P3; resistors R12, R13, R15, R16, R17, R18, R19 and R29; and section 1 of switch SW1. With switch SW1 in position 3 current flows from the battery 44 through diode D4, switch section 1, fuse F1, filter coil L1, down through resistor R13, potentiometer P3, through the switch section 2 to condenser C13. Condenser C13 will start to charge. The voltage across condenser C13 is the same voltage as that seen by the base of transistor Q7. There is a voltage on the emitter of transistor Q7 established by the voltage drop across resistor R19 which is greater than the cut-off voltage of transistor Q7. Therefore when the voltage across condenser C13 equals the cut-off voltage across resistor R19 transistor Q7 starts to conduct. As transistor Q7 starts to conduct the voltage at its collector goes towards the voltage across resistor R19. The base voltage of transistor Q6 is established by resistors R17 and R18. The base current of transistor Q6 starts to decrease because of the fact of the potential at the collector of transistor Q7 is decreasing. This causes transistor Q6 to start to turn off. As transistor Q6 starts to turn off the collector will start to increase in potential. As the potential across the collector increases current will start to flow down through resistor R15, through resistor R16, and down through the base of transistor Q8. The emitter-collector junction of transistor Q8 is directly across the charging capacitor C13 and as its base current increases its resistance from emitter to collector decreases and discharges capacitor C13. Transistor Q8 will discharge capacitor C13 back down to the turn off potential where the emitter of transistor Q6 again returns to sufficient voltage that conduction through transistor Q6 and resistor R15 applies voltage to the base of transistor Q8 to turn it off. Transistor Q8 speeds up the discharge of condenser C13 back down to the cut-off of transistor Q7. The discharge time, governed by resistor R16 and resistor R29 is that required to shape a pulse sufficiently wide to turn the oscillator circuit on for the selected length of time.

The oscillator portion includes: an NPN type transistor Q5; transformer T4; condensers C12 and C15; and resistor R14. The base of transistor Q5 is at the same direct current potential as coupling capacitor C14 because of the path through the winding of the low impedance side of transformer T4. When a voltage pulse is applied to capacitor C14 by action of the time base circuit, transistor Q5 is forward biased into conduction. The tuned circuit of transformer T4 and capacitor C12 is adjusted to the resonant frequency of the transducer 10. The low impedance winding of transformer T4 provides the alternating current feedback to the base of transistor Q5. When transistor Q5 conducts, oscillation starts. Transistor Q5 will oscillate for a period of time governed primarily by the width of the voltage pulse applied to capacitor C14, by the time base circuit. This duration may be from approximately 75 microseconds to 150 microseconds.

Position 2 on switch SW1 provides for a second range for deeper water utilizing resistor R12 and potentiometer P2. The time base circuit operation in this position is the same as above with the additional feature of an increased pulse width such as approximately 400 microseconds on this range. This causes a wider pulse signal to appear at condenser C14 and the duration of oscillation of the oscillator circuit to increase correspondingly.

The burst of AC energy from the oscillator circuit is coupled to the power amplifier through coupling capacitor C11. The power amplifier includes resistor R1, and transistor Q1. Self biasing of transistor Q1 is accomplished by resistor R1. The output at the collector of Q1 is applied to a low impedance tap on the tuned winding of the input-output transformer 16. Energy from the tuned winding of transformer 16 is applied to transducer 10.

A returning acoustic echo is converted by the transducer 10 into a pulse of high frequency electrical energy. This pulse is applied to the transducer winding of transformer 16 and to the amplifier first stage. The high gain first amplifier stage includes: transistor Q2; transformer T2; capacitors C2, C3, and C4; and resistors R2, R4, and R5. The echo signal is coupled from the high impedance winding of transformer 16 to the base of transistor Q2 by means of condenser C2. During the transmitted pulse, the high voltage which is developed across transformer 16 is prevented from damaging transistor Q2 by the high reactance of condenser C2. The resistors R2 and R4 establish the initial biasing of transistor Q2. The capacitor C3 functions as an emitter bypass.

The time varying gain control circuit (number 38 in FIG. 1) consists of capacitor C13 and isolating resistor R3. The ramp voltage appearing across the emitter-collector junction of transistor Q8, and thereby across capacitor C13, is applied by way of resistor R3 to the base of amplifier transistor Q2. Immediately after the transmission of the main pulse, the forward base biasing voltage of transistor Q2 is a low value. As the elapsed time increases the forward bias increases, thus, the gain of transistor Q2 is controlled over the entire receiving portion of the sounding cycle. The output of transistor Q2 is applied to the tap on the primary winding of transformer T2. This winding is resonated to the operating frequency by capacitor C4. Transformer T2 provides an impedance transformation between the collector of transistor Q2 and the base of the following stage.

The second stage amplifier consists of the following components: transistor Q3, transformer T3; potentiometer P1; condensers C6, and C7; and resistors R6, R7 and R8. The signal path is from the secondary of transformer T2 to the base-emitter junction of transistor Q3. The resistors R5 and R6 form a voltage divider which establishes the direct current potential on the base of transistor Q3. The potentiometer P1 and resistor R8 form an adjustable voltage divider. The base-emitter junction of transistor Q3 and resistor R7 are connected in series between these two voltage dividers, thus, establishing the base and emitter currents. Gain in this amplification stage is manually adjusted by potentiometer P1, gain being controlled by virtue of the dependance of transistor gain on emitter current and also by limiting the possible collector voltage swing. The signal at the collector of transistor Q3 is applied to the tap on the primary of transformer T3. The capacitor C7 tunes the primary of transformer T3 to resonance and the signal is coupled to the detector by means of the secondary winding.

The detector components are: transistor Q4; diode D1; condensers C8 and C9; and resistors R9, R10 and R11. The base of transistor Q4 is biased to a point just below conduction by the voltage divider network of resistor R9 and diode D1. The positive going portion of the signal from transformer T3 drives transistor Q4 into conduction thereby accomplishing detection. The resistor R10 provides a path for collector current flow. The capacitor C8 provides a low impedance path to ground for any high frequency components in the collector circuit. Capacitor C9 and resistor R11 also provide a DC return for diode D2.

The metering circuit consists of the following components: transistors Q9 and Q10; zener diode D3; meter 26; capacitor C18; and resistors R20, R21, R22, R23, R24, R25, R26 and R27. The operation is as follows: the system initiating pulse from the time base circuit is transmitted by coupling capacitor C17 to the base of transistor Q9. Since the base of transistor Q9 is negative, the transistor is reverse biased and collector current ceases to flow. This allows the collector potential to rise toward the zener voltage of diode D3 which in turn causes current to flow through resistor R23 into the base of transistor Q10. Transistor Q10 is biased on, producing a current flow through the meter 26. Current through meter 26 will continue to flow until a returning echo produces a signal at the collector of the detector transistor Q4. The negative going leading edge of the echo pulse is conducted through the diode D2 to the base of transistor Q10. This in turn drives transistor Q10 out of conduction and, due to the increasing collector voltage of transistor Q10, transistor Q9 is again reset to the conducting condition. Since the emitter current of transistor Q10 is a repetitive unipolar pulse of current the needle of meter 26 would be unsteady without capacitor C18. The capacity of capacitor C18 in conjunction with the meter resistance and resistor R24 provides a time constant sufficiently large to maintain a reasonably constant voltage across meter 26, thereby reducing the pulsation of the meter pointer.

In the illustrated embodiment of FIG. 3, the time varying gain control portion of the invention is achieved by applying voltage across the capacitor C13 through resistor R3 to the base of the first stage amplifier transistor Q2. Manual control of the receiver gain is achieved through potentiometer P1 which varies the gain of the second stage amplifier transistor Q3.

The two section switch SW1 is illustrated as having four positions. Position 1 is the off position. Positions 2 and 3 provide for measurement with varying ranges depending upon the values of resistors R12 and R13 and potentiometers P2 and P3. Position 4 is a battery test position. In switch position 4 a resistor R28 is placed in series with meter 20 across battery 44. As long as battery 44 is properly charged sufficient current will flow through the resistor R28 and meter 26 to give a preselected minimum reading of the meter.

The invention as exemplified in the embodiment of FIG. 3 has been demonstrated in the circuit arrangement in which the circuit components have the following values:

| Resistor | R1 | 330 | Ohm |
| --- | --- | --- | --- |
| Resistor | R2 | 330K | Ohm |
| Resistor | R3 | 680K | Ohm |
| Resistor | R4 | 1K | Ohm |
| Resistor | R5 | 22K | Ohm |
| Resistor | R6 | 100K | Ohm |
| Resistor | R7 | 2.2K | Ohm |
| Resistor | R8 | 22K | Ohm |
| Resistor | R9 | 10K | Ohm |
| Resistor | R10 | 10K | Ohm |
| Resistor | R11 | 68K | Ohm |
| Resistor | R12 | 180K | Ohm |
| Resistor | R13 | 100K | Ohm |
| Resistor | R14 | 1K | Ohm |
| Resistor | R15 | 3.3K | Ohm |
| Resistor | R16 | 47K | Ohm |
| Resistor | R17 | 10K | Ohm |
| Resistor | R18 | 22K | Ohm |
| Resistor | R19 | 1.5K | Ohm |
| Resistor | R20 | 68K | Ohm |
| Resistor | R21 | 10K | Ohm |
| Resistor | R22 | 330K | Ohm |
| Resistor | R23 | 150K | Ohm |
| Resistor | R24 | 270 | Ohm |
| Resistor | R25 | 5.6K | Ohm |
| Resistor | R26 | 680 | Ohm |
| Resistor | R27 | 68K | Ohm |
| Resistor | R28 | 13.5K | Ohm |
| Resistor | R29 | 4.7K | Ohm |
| Capacitor | C1 | 1500 | pf |
| Capacitor | C2 | 250 | pf |
| Capacitor | C3 | .1 | mfd |
| Capacitor | C4 | 250 | pf |
| Capacitor | C5 | 1500 | pf |
| Capacitor | C6 | 5 | mfd |
| Capacitor | C7 | 250 | pf |
| Capacitor | C8 | .0047 | mfd |
| Capacitor | C9 | 1500 | pf |
| Capacitor | C10 | .82 | mfd |
| Capacitor | C11 | 1500 | pf |
| Capacitor | C12 | 1500 | pf |
| Capacitor | C13 | .2 | mfd |
| Capacitor | C14 | .01 | mfd |
| Capacitor | C15 | .01 | mfd |
| Capacitor | C16 | 150 | mfd |
| Capacitor | C17 | 1500 | pf |
| Capacitor | C18 | 3500 | mfd |
| Capacitor | C20 | .1 | mfd |
| Potentiometer | P1 | 5K | ohms |
| Potentiometer | P2 | 250K | ohms |
| Potentiometer | P3 | 100K | ohms |
| Transistor | Q1 | type | 2N3402 |
| Transistor | Q2 | type | 2N3860 |
| Transistor | Q3 | type | 2N3860 |
| Transistor | Q4 | type | 2N3860 |
| Transistor | Q5 | type | 2N3860 |
| Transistor | Q6 | type | 2N3860 |
| Transistor | Q7 | type | 2N3860 |
| Transistor | Q8 | type | 2N3860 |
| Transistor | Q9 | type | 2N 3860 |
| Transistor | Q10 | type | 2N3860 |
| Diode | D1 | type | 1N2069 |
| Diode | D2 | type | 1N52 |
| Diode | D3 | type | 1N755 |
| Diode | D4 | type | 1N2069 |
| Transformer | 16 | turns | ratio 1 to 1.2 |
| Transformer | T2 | turns | ratio 17.5 to 1 |
| Transformer | T3 | turns | ratio 10 to 1 |
| Transformer | T4 | turns | ratio 1 to 11.8 |
| Meter | 26 | 1 M.A. | Full scale |

While the invention has been described in much detail it is understood that such is by way of exemplification only. The invention is not to be limited by the abstract herein, nor the summary, nor the exemplified embodiment which has been described for purposes of illustrating the invention, but the invention is to be limited only by the scope of the attached claim or claims, including the full range of equivalency to which each element or step thereof is entitled.

What is claimed:

1. An improved depth sounder for detecting the depth of objects under the water comprising:

a transducer for imparting sound pulses in response to electrical energization and in turn for providing an electrical signal output in response to reflected sound pulses;

a resonant tank circuit having a transducer output-input connected to said transducer, a transmitting signal input, and a signal output;

a voltage source having a positive pole and a negative pole;

a time base circuit having a first, a second and a third NPN transistor each having a base, a collector and an emitter, the base of the first transistor being connected to the collector of the second transistor through a resistor, and the base of the second transistor being connected to the collector of the third transistor, the emitter of the first and second transistors being connected to the negative pole of said voltage source through a common resistor, the collectors of the first and second transistors being connected to the positive pole of said voltage source through separate resistors, the collector of the first transistor being connected to the base of the third transistor through a resistor, a capacitor connected across the collector-emitter junction of the third transistor, the emitter of the third transistor being connected to said voltage source negative pole and a resistor being connected between the third transistor base and said voltage source negative pole, the voltage signal appearing at the collector of said first transistor providing timing voltage signal of preselected pulse frequency, each pulse being of a preselected duration and the voltage signal appearing at the collector of the third transistor providing a ramp gain control signal at the same frequency as the timing voltage pulses;

an oscillator circuit having an input connected to receive said time base circuit timing voltage signal and an output, the oscillator circuit providing time spaced bursts of electrical energy in response to energization by said time base circuit, the output of the oscillator circuit being connected to said resonant tank circuit transmitting signal input;

a receiver amplifier circuit having an input, an output and a biasing signal input, the output of the amplifier being connected to said resonant tank circuit signal output;

a metering circuit having a first input, a second input, the first input of the metering circuit being connected to said time base circuit output whereby each of said time spaced voltage pulses of said time base circuit initiates a measuring sequence in the metering circuit, the second input of the metering circuit being connected to said amplifier circuit output whereby signals received from said amplifier circuit in response to amplified signals generated by said transducer in response to receipt of sound pulses as an indication of the distance to the surface reflecting the sound pulses from said transducer, said amplifier circuit connected to receive said time base circuit gain control signal whereby said amplifier circuit has impressed thereon a time varying biasing voltage following each timing voltage signal pulse, such biasing voltage applied to said amplifier circuit serving to increase the amplification of said amplifier circuit with time whereby the signals resulting from reflective surfaces at greater distances from said transducer are amplified more than signals resulting from closer reflective surfaces.

2. An improved depth sounder according to claim 6 including:
a second receiver amplifier circuit having an input and an output, the input being connected to said first mentioned receiver amplifier circuit and the output being connected to said metering circuit providing two stages of amplification between said transducer means and said metering circuit; and
a manual gain control in said second receiver amplifier circuit providing a two stage amplifier arrangement having a manual gain control and a time varying automatic gain control superimposed thereon.

3. An improved depth sounder according to claim 6 including:
a detector circuit having an input and an output, the input being connected to said receiver amplifier circuit and the output connected to said metering circuit, the detector circuit providing means of detecting the occurrence of reflected sound pulses by said transducer means and actuating said metering circuit in response thereto.

4. An improved depth sounder according to claim 6 wherein said metering circuit includes a bi-stable multivibrator circuit, the transmitted signal from said oscillator circuit serving to set the multivibrator circuit in one of two stable states and the returning echo received by said transducer means and amplified by said receiver amplifier circuit serving to trigger the multivibrator circuit to the other of the stable states; and
including a meter connected to measure average current flow occurring during one of the stable states of said multivibrator.

* * * * *